United States Patent [19]

Carville et al.

[11] Patent Number: 4,650,853

[45] Date of Patent: Mar. 17, 1987

[54] PROCESS OF POLYMERIZING EPOXIDES IN SOLVENT MIXTURES TO FORM GRANULAR POLYMER PRODUCTS

[75] Inventors: Donna B. Carville, Plaquemine; Samuel J. Washington, Baton Rouge, both of La.

[73] Assignee: The Dow Chemical Company, Midland, Mich.

[21] Appl. No.: 798,664

[22] Filed: Nov. 15, 1985

[51] Int. Cl.$^4$ .................... C08G 65/12; C08G 65/08
[52] U.S. Cl. .................................... 528/416; 528/408
[58] Field of Search ............................... 528/408, 416

[56] References Cited

U.S. PATENT DOCUMENTS

| | | |
|---|---|---|
| 2,870,100 | 1/1959 | Stewart et al. . |
| 2,941,963 | 6/1960 | Bailey, Jr. et al. . |
| 2,956,959 | 10/1960 | Detter . |
| 3,167,519 | 1/1965 | Hill et al. . |
| 3,459,688 | 8/1969 | Hsieh ............................... 528/408 X |
| 3,642,667 | 2/1972 | Steller . |
| 3,654,183 | 4/1972 | Klein et al. ..................... 528/408 X |
| 3,767,599 | 10/1973 | Zeist et al. .......................... 528/408 |
| 3,776,863 | 12/1973 | Shibatani et al. . |
| 3,849,364 | 11/1974 | Vandenberg . |
| 4,193,892 | 3/1980 | Goeke et al. .................... 528/413 X |
| 4,460,703 | 7/1984 | Carville . |

OTHER PUBLICATIONS

AICHE Journal, 17 (6), 1505, (1971).
Chemical Abstracts, 86, 44, 86:17598z, (1977).

Primary Examiner—Earl Nielsen

[57] ABSTRACT

Epoxides are polymerized in granular form which is easily processed. The polymerization occurs in a solvent system composed of significant portions of two different solvents.

20 Claims, No Drawings

PROCESS OF POLYMERIZING EPOXIDES IN SOLVENT MIXTURES TO FORM GRANULAR POLYMER PRODUCTS

BACKGROUND OF THE INVENTION

This invention relates to an improved process for the polymerization of epoxides to form granular polymer products.

Granular epoxide polymer products are useful as flocculants, thickeners, gels, friction reduction agents and dispersants.

Methods of polymerizing epoxides to form solid polymer particles are known. For example, U.S. Pat. No. 2,941,963 describes a process of polymerizing ethylene oxide to form "granular polymer product" by carrying out the polymerization in a solvent for ethylene oxide in which the polymer is insoluble (suspension polymerization). The polymerization reaction is catalyzed by a basic catalyst such as a hexammoninate, a decomposition product thereof or an alkaline earth metal amide.

U.S. Pat. No. 4,460,703 describes a novel catalyst for epoxide polymerization. This catalyst comprises the reaction product of: (1) a trialkylaluminum compound, (2) phenothiazine, (3) 1,4-dioxane or tetrahydrofuran, (4) water, and (5) acetylacetone. This catalyst demonstrates improved rates of polymerization for epoxide homopolymers and copolymers.

Unfortunately, the catalysis system of U.S. Pat. No. 4,460,703 cannot be used in the suspension polymerization of U.S. Pat. No. 2,941,963. When attempted, a solid hard polymer which coats the reaction vessel is formed rather than a granular product.

Therefore, it would be desirable to have a method of producing granular polymer products that cannot be formed via conventional suspension polymerization methods.

SUMMARY OF THE INVENTION

The present invention is such a process for producing a granular polymer. The process comprises polymerizing an epoxide in a liquid organic medium. This liquid organic medium is a single phase mixture of (1) a first organic liquid which is a solvent for both the epoxide and the resultant polymer product, and (2) a second organic liquid which is a solvent for the epoxide and a nonsolvent for the resultant polymer product. The polymerization is conducted under reaction conditions and with a ratio of said organic liquids sufficient to form a granular polymer product.

It is surprising that the use of this invention's liquid organic medium will result in granular polymerization products in cases where conventional suspension polymerization does not produce granular polymer products. Prior to this invention there was no single phase solvent system to allow the polymerization of epoxides to solid polymer particles if use of solvents such as the second organic liquid produced a product other than solid polymer particles.

The solid polymer particles are useful as flocculants, thickeners, gels, friction reducing agents and dispersants.

DETAILED DESCRIPTION OF ILLUSTRATIVE EMBODIMENTS

The process of this invention comprises polymerizing an epoxide to form a normally solid, granular polymer product in a liquid organic mixture. Such granular product cannot be formed by conventional suspension polymerization methods.

For the purposes of this invention, conventional suspension polymerization is the polymerization of epoxides in a liquid organic medium which medium is a solvent for the epoxide and a nonsolvent for the polymerization polymer.

For the purposes of this invention, granular polymer products means discrete polymer particles, which upon gentle agitation as by a magnetic stirring rod, will form a suspension in a mass of water ten times the mass of the polymer particles. This suspension rapidly decomposes upon cessation of agitation.

Epoxides useful in practicing this invention have the following formula:

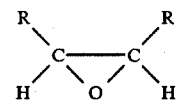

wherein each R, individually, can be hydrogen, or a hydrocarbon radical such as alkyl, aryl, cycloalkyl, aralkyl, or alkaryl radicals. In addition, both R variables together with the epoxy carbon atoms, i.e., the carbon atoms of the epoxy group,

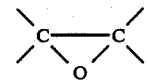

can represent a saturated cycloaliphatic or unsaturated cycloaliphatic or aromatic hydrocarbon radical containing from 4 to 10 carbon atoms, preferably from 4 to 8 carbon atoms, such as cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. The hydrocarbon radicals may contain one or more unreactive substituents and may contain one or more unreactive heteroatoms. Illustrative R radicals include, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like.

Representative epoxides which can be employed include, for example, ethylene oxide; propylene oxide; 1,2-butylene oxide; 2,3-butylene oxide; the epoxypentanes; the epoxyhexanes; 2,3-epoxyheptane; the epoxynonanes; 5-butyl-3,4-epoxyoctane; 1,2-epoxydodecane; 1,2-epoxyhexadecane; 1,2-epoxyoctadecane; 5-benzyl-2,3-epoxyheptane; 4-cyclohexyl-2,3-epoxypentane; the chlorostyrene oxides; styrene oxide; the ethylstyrene oxides; glycidyl benzene; the oxabicycloalkanes and alkyl-substituted oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo[3.1.0]hexane, the like and mixtures thereof.

It is preferred that a lower epoxide be employed as a starting material in the homopolymerization reaction. In polymerizing an admixture comprising two different epoxides, it is also preferred that one of the epoxides be a lower epoxide. Lower epoxides encompasses monomers such as ethylene oxide, propylene oxide, 1,2-epoxybutane, 2,3-epoxybutane, and the like. Most preferred epoxides are 90 weight percent ethylene oxide and 10 weight percent butylene oxide.

The polymerization reaction is carried out in an unreactive, single phase liquid organic medium. For the purposes of this invention, the term unreactive means does not react or if reactive, does not react to a degree sufficient to prevent the formation of particulate polymer, preferably less than about 10 mole percent of the amount present reacts, more preferably less than about 5 mole percent of the amount present reacts and most preferably, less than about 1 mole percent of the amount present reacts. This single phase medium is a mixture of two organic liquids. The first organic liquid is a solvent for both the epoxide and the polymer and preferably consists essentially of a single organic compound, more preferably is an aromatic organic compound. For the purposes of this invention, solvent for a material means that the solvent can dissolve at least about 20 weight percent, based on the weight of the solvent of the material in question under the reaction conditions, more preferably at least about 50 weight percent and most preferably at least about 70 weight percent. Examples of these aromatic organic compounds are toluene, benzene, the xylenes, the cresols, the naphthalenes and derivatives thereof bearing unreactive substituents such as alkyl, aryl or alkoxy. The most preferred first organic compound is toluene. The second organic liquid is a solvent for the epoxide and a nonsolvent for the polymer and preferably consists essentially of a single organic compound, more preferably is an aliphatic organic compound. For the purposes of this invention, nonsolvent for a material means that the nonsolvent can dissolve less than about 5 weight percent, based on the weight of the nonsolvent of the material in question, under the reaction conditions, more preferably less than about 1 weight percent and most preferably less than about 0.1 weight percent. Examples of these aliphatic organic compounds are the hexanes, the heptanes, the octanes, cyclohexane, cycloheptane, cyclooctane, the propanols, methanol, diethyl ether and derivatives thereof bearing unreactive substituents such as alkyl, aryl or alkoxy. The most preferred second organic compound are the hexanes themselves.

It is preferred that each organic liquid composes between about 80 and about 20 weight percent of the liquid organic medium. More preferred are mixtures in which each organic liquid composes between about 60 and about 40 weight percent of the mixture. A particularly preferred embodiment is one in which the first organic liquid composes about 40 weight percent of the mixture.

The use of any catalyst system which can catalyze the polymerization of epoxides but does not produce granular polymer products in conventional suspension polymerization is suitable. Preferred are those described in U.S. Pat. No. 4,460,703, now incorporated by reference. U.S. Pat. No. 4,460,703 provides an improved aluminum-based coordination catalyst for the polymerization of epoxides comprising the reaction product of:
  (1) a trialkylaluminum compound corresponding to the formula Al(R$^1$)$_3$ wherein R$^1$ is independently each occurrence a C$_{1-5}$ alkyl radical;
  (2) phenothiazine;
  (3) a Lewis base selected from the group consisting of 1,4-dioxane and tetrahydrofuran;
  (4) water; and
  (5) acetylacetone, wherein the ratio in moles of trialkylaluminum compound/phenothiazine/Lewis base/water/acetylacetone is from about 1.0/0.1/1.0/0.2/0.2 to about 1.0/1.0/6.0/1.0/1.0.

In the aforementioned catalyst, the trialkylaluminum compound is preferably trimethylaluminum, triethylaluminum or triisopropylaluminum. The catalyst is prepared by the method described in U.S. Pat. No. 4,460,703.

Preferably, the catalyst is present at a concentration above about 0.01 mole percent, based on epoxide, more preferably above about 0.5 mole percent, based on epoxide. More preferably, the catalyst is present at a concentration below about 2 mole percent, based on epoxide and most preferably below about 1 mole percent, based on epoxide.

The polymerization is optionally assisted by the addition of a chelating agent. Suitable chelating agents are oxygenated organics containing at least two oxygen atoms per molecule. Preferable chelating agents are acetylacetone and tetrahydrofuran.

Preferably, the catalyst is contacted with any chelating agent and a portion of the liquid organic mixture. The remainder of the liquid organic mixture is then added. Finally, contact with the epoxide commences polymerization. The contact may occur in conventional equipment such as a stirred batch reactor or in a continuous flow reactor. Preferred is the use of continuous flow reactors.

The contact can occur at any temperature in which particulate polymer is formed, preferably above about 25° C., more preferably above about 50° C. The temperature preferably is below about 100° C., more preferably below about 90° C.

The contact can occur at any pressure in which particulate polymer is formed, preferably above about 40 psig, more preferably above about 60 psig. The pressure is preferably below about 100 psig, more preferably below about 90 psig.

The solid polymer particles may be recovered from the liquid organic mixture by conventional means such as filtration and centrifuging.

The invention is further illustrated by the following nonlimiting illustrative embodiment.

ILLUSTRATIVE EMBODIMENT

A 1-liter stirred stainless steel reaction kettle is purged with nitrogen and 0.8 g (0.004 mole) of phenothiazine is placed in the reaction kettle. Hexane (52 g, 0.61 mole) is added to the reaction kettle and mixed with the phenothiazine. The mixture is placed in an ice water bath. Triisobutylaluminum (1.78 g, 0.009 mole as an 18 weight percent solution in hexane) is transferred from a nitrogen blanketed stainless steel container to the reaction kettle. Tetrahydrofuran, dried by molecular sieve (19.2 g, 0.24 mole), is dropwise added to the reaction mixture. The kettle is then filled with 252.5 g (2.52 moles) of toluene and 99.1 g (1.15 moles) of hexane. Toluene is the first organic liquid and hexane is the second organic liquid. These organic liquids together are the liquid organic medium of this invention. This mixture is transferred through teflon tubing to a 1-liter Parr reactor purged with nitrogen. The reactor is sealed and pressurized to 20 psig with nitrogen. The reactor is heated to 90° C. for 30 minutes to "age" the catalyst. The reactor is cooled to 50° C. A mixture of 19:1 weight ratio of ethylene oxide to butylene oxide is added at a rate of 0.005 liters/minute to deliver 102.7 g of epoxide reactants. The reactor is heated to a temperature of 85° C. for 2 hours. The reactor is cooled and the particulate polymer is filtered from the reaction mixture and washed with about 0.2 liter of a 5 weight percent isopropanol in hexane solution based on the weight of the hexane solution and dried at a pressure of 100 psia for 4 to 12 hours at room temperature in a vacuum oven. The yield of the reaction is 76.11 g of a particulate solid about 300 mesh which is a yield of 74.11 weight percent of polymer product based on total reactants.

The intrinsic viscosity of the polymer is determined by a Brookfield viscometer. Model LV using spindle #1 with a 1 weight percent solution in water with a speed of 6 to 12 rpm. The average molecular weight is calculated by the Mark-Houwink equation to be about 100,000 amu.

A solution of the polymer is made by mixing 10 g of polymer in 90 g of water and 5 ml of isopropanol for 3 hours to dissolve the polymer. This solution is added to water to make water solutions of various concentrations. The viscosities of these solutions are measured by a Brookfield viscometer, as described above. The results are reported in Table I.

TABLE I

| Weight Percent Polymer Solution | Viscosity (cps) |
|---|---|
| 1.0 | 2.98 |
| 2.5 | 12.0 |
| 5.0 | 60.3 |
| 7.5 | 156.3 |
| 10.0 | 501.3 |

This example demonstrates the formation of the granular polymer and the thickening effect of the granular polymer.

I claim:

1. A process for producing granular polymer products, using a polymerization reaction which does not form a granular polymer product using conventional suspension polymerization conditions, which comprises polymerizing an epoxide in a liquid organic medium which is a single phase mixture of (1) a first organic liquid which is a solvent for both the epoxide and the resulting polymer product, and (2) a second organic liquid which is a solvent for the epoxide and a nonsolvent for the resulting polymer product whereby the polymerization conditions and the ratio of said organic liquids are such that the polymer is formed as granular polymer products.

2. The process of claim 1 in which the catalyst system consists essentially of the reaction product of
   (a) a trialkylaluminum compound corresponding to the formula Al(R)$_3$ wherein R is independently each occurrence a lower alkyl radical;
   (b) phenothiazine;
   (c) a Lewis base selected from the group consisting of 1,4-dioxane and tetrahydrofuran;
   (d) water; and
   (e) acetylacetone,
wherein the ratio in moles of trialkylaluminum compound/phenothiazine/Lewis base/water/acetylacetone is from about 1.0/0.1/1.0/0.2/0.2 to about 1.0/1.0/6.0/1.0/1.0.

3. The process of claim 2 in which the trialkylaluminum compound is triisobutylaluminum.

4. The process of claim 1 in which the epoxide contains ethylene oxide.

5. The process of claim 4 in which ethylene oxide comprises at least about 50 weight percent of the epoxide contacted.

6. The process of claim 5 in which the epoxide comprises ethylene oxide and butylene oxide.

7. The process of claim 6 in which the weight ratio of ethylene oxide to butylene oxide is about 19:1.

8. The process of claim 1 in which each organic liquid consists essentially of a single organic compound.

9. The process of claim 1 in which each organic liquid comprises between about 80 weight percent and about 20 weight percent of the organic liquid mixture.

10. The process of claim 9 in which each organic liquid comprises between about 60 weight percent and about 40 weight percent of the organic liquid mixture.

11. The process of claim 10 in which the first organic liquid is an aromatic compound.

12. The process of claim 11 in which the first organic liquid is toluene.

13. The process of claim 10 in which the second organic liquid is an aliphatic organic compound.

14. The process of claim 13 in which the second organic liquid is a hexane or a derivative thereof bearing unreactive substituents such as alkyl, aryl or alkoxy.

15. The process of claim 14 in which the second organic liquid is a hexane.

16. The process of claim 9 in which the first organic liquid comprises about 40 weight percent of the organic liquid mixture.

17. The process of claim 1 in which the temperature of the polymerization occurs at a temperature between about 30° C. and about 120° C.

18. The process of claim 17 in which the temperature of the polymerization occurs at a temperature between about 50° C. and about 90° C.

19. The process of claim 1 in which the polymerization occurs at a pressure between about 40 psig and about 100 psig.

20. The process of claim 14 in which the polymerization occurs at a pressure between about 60 psig and about 90 psig.

* * * * *